United States Patent

Cox

[15] 3,688,484
[45] Sept. 5, 1972

[54] GARDEN TOOL
[72] Inventor: Eugene O. Cox, 16150 E. Harvest Moon St., La Puente, Calif. 91744
[22] Filed: Sept. 13, 1971
[21] Appl. No.: 179,785

[52] U.S. Cl. ............................................. 56/400.12
[51] Int. Cl. ................................................ A01d 7/10
[58] Field of Search ......... 56/400.12, 400.16, 400.17, 56/400.18, 400.19, 400.04

[56] References Cited

UNITED STATES PATENTS

| | | | |
|---|---|---|---|
| 2,908,131 | 10/1959 | Ross | 56/400.04 |
| 3,105,348 | 10/1963 | Vosbikian et al. | 56/400.12 |
| 3,350,866 | 11/1967 | Spencer | 56/400.12 |

*Primary Examiner*—Russell R. Kinsey
*Attorney*—Wm. Jacquet Gribble

[57] ABSTRACT

A first rake head is fixed to an elongate handle and combined with a second rake head and handle by a pivot pin connecting the handles at a central point such that the rake tines may be brought together in opposite hand orientation to lift gathered material to a receptacle. Preferably the pivot pin connects the rake handles at a flatted area on each handle to provide free motion of the rake heads to and from each other. The flatted portion of each handle may be separable from the shank of the rake handle extending from the tines.

3 Claims, 6 Drawing Figures

PATENTED SEP 5 1972
3,688,484
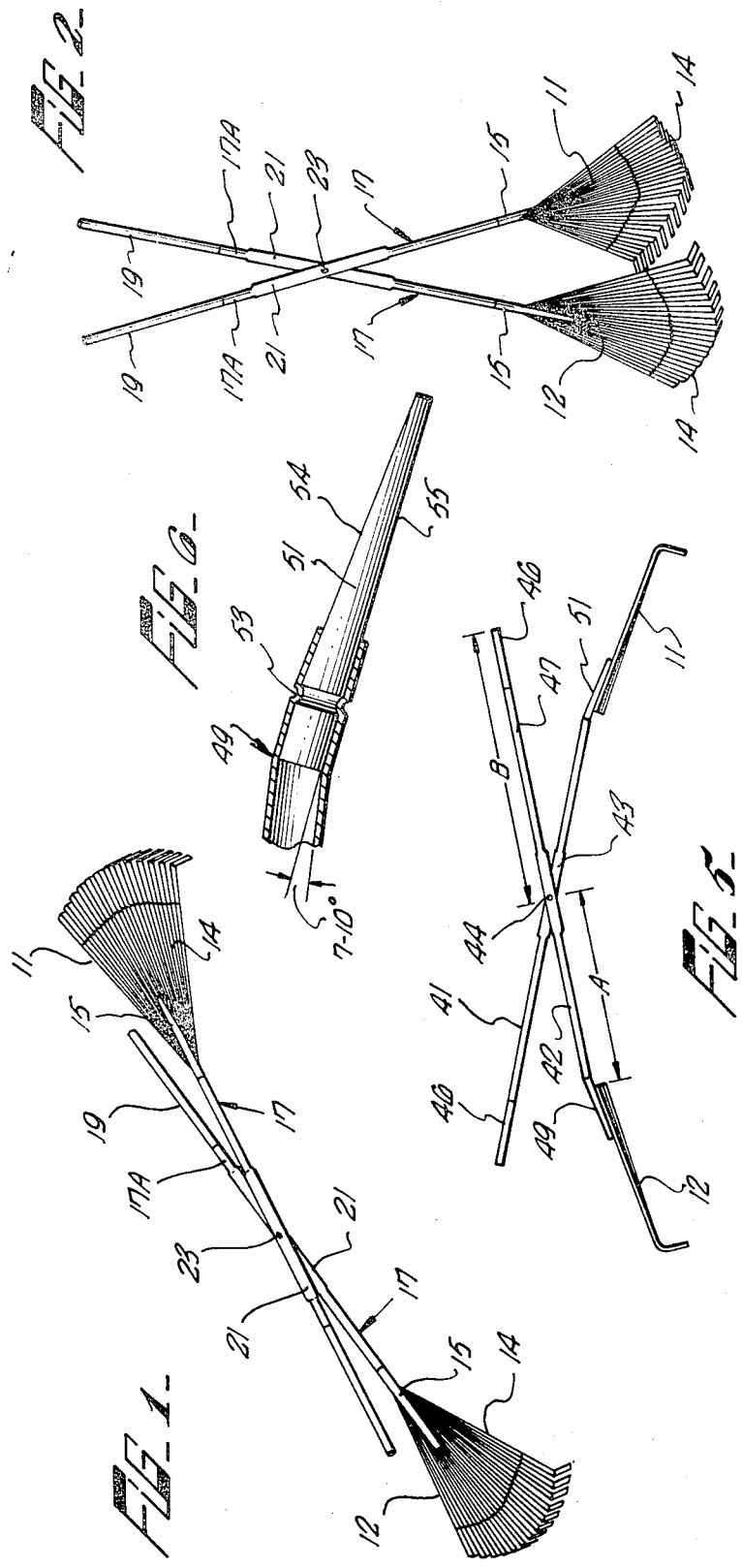
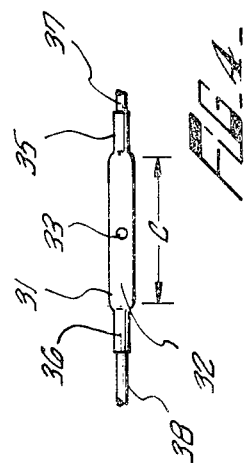
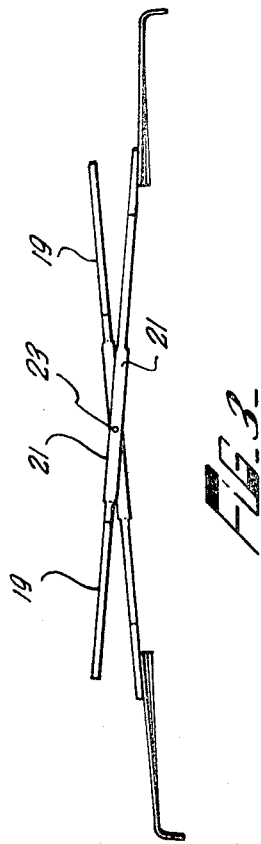

GARDEN TOOL

BACKGROUND OF THE INVENTION

Garden rakes of various types, sizes and materials have been developed which are very efficient in gathering materials from lawns and garden patches into a compact pile. However, the conventional rake requires a dust pan or scoop shovel or other scoop device to transfer the raked pile into a receptacle. I have invented a garden tool which eliminates the need for a second tool for lifting the raked pile and which manipulates easily to accomplish the two functions of raking and lifting.

SUMMARY OF THE INVENTION

The invention contemplates first and second rake heads each comprising a plurality of tines, each of the rake heads having a shank portion extending from the tines to an intermediate handle portion which is flat in a plane perpendicular to the normal plane of the rake head. A pivot joins the two handles at the flat portions such that the heads are congruently oriented with respect to the flatted handles. A grip portion extends from each flat portion.

The extent of the flat on each handle from the pivot pin in each axial direction of the handle is such that the rake tines may be brought together within the overlap scope of the flat portions of the rake handles.

One embodiment of the invention comprises a rake head for each rake with a shank extending to an intermediate pivot portion which in turn connects to an elongate handle grip portion.

The garden tool of the invention affords quick and efficient raking and gathering of materials without the need of auxiliary tools and is easily manipulated either in raking or gathering conditions. These and other advantages of the invention are apparent from the following detailed description and drawing.

BRIEF DESCRIPTION OF THE DRAWING

FIG. 1 is a perspective view showing the garden tool of the invention with the rake heads separated in raking condition;

FIG. 2 is a perspective elevation showing the rake heads oriented in lifting position;

FIG. 3 is a side elevation showing the rake heads in an intermediate position; position;

FIG. 4 is an enlarged fragmentary view of the intermediate portion of a handle;

FIG. 5 is a side elevation of an embodiment of the invention differing in the intermediate area; and FIG. 6 is a fragmentary sectional view of the rake head joint of the embodiment of FIG. 5.

DESCRIPTION OF THE PREFERRED EMBODIMENTS

Like reference characters are used to designate like parts in the various views.

In FIG. 1 each of a pair of garden rake heads 11, 12 has a plurality of tines 14 fixed to a cylindrical shank 15 which fits into a tubular handle 17. Each handle 17 has a grip connector portion 17A into which a hand grip 19 fits. Preferably the handle is of tubular metal or plastic capable of deformation and the handles' grips 19 are of a hard wood.

Intermediate the handles 17 each has a flat portion 21. The flat extends in a plane perpendicular to the fan plane of the tines 14. A pivot pin 23 joins the flat portions such that their flat extents are parallel.

As can be seen from FIGS. 1 and 2, the rake of the invention may be used either as a normal hand rake using one of the rake heads or may be pivoted into the position of FIG. 2 such that the rake heads are adjacent one another to lift the gathered material which has been raked.

FIG. 3 shows in elevation an intermediate position of the rake heads with respect to one another wherein the relation of the flat areas 21 is evident. The extent of the handle 17 and hand grip 19 of each rake head of the invention may be approximately 31 inches. The pivot is normally 15 inches from the gathered end of the tines and the flat portion of each handle is approximately 12 inches long in order for the hand grip 19 of one rake not to interfere with handle portion adjacent the rake head of the other rake when the tool of the invention is positioned in the attitude of FIG. 1 for use as a rake. The dimensions may vary, depending upon the size of the hand grip and the handles. Preferably the handles are made of 1-inch O.D. tubing and the hand grips may be of 7/8-inch dowling.

Materials will vary, depending upon the type of tines used. FIGS. 1–3 show a rake in accordance with the invention utilizing conventional bamboo tines. However, spring steel tines may be utilized with equal facility. In FIG. 4 the rake handle comprises a pivot section 31 having a flat area 32 of approximately 12 inches extent. A hole 33 accepts a pivot pin 23 like the pivot pin of the embodiment of FIG. 1. The pivot portion 31 has cylindrical ends 35, 36 which accept a hand grip 37 and a rake head stub 38. Grip 37 may be either hard wood or plastic, as desired, Stub 38 may be metallic or wooden, depending upon the type of tines to which it is attached. The tines are not shown.

In some instances the attitude of the rake heads with respect to the extent of the handle is not optimum for the lifting operation. FIGS. 5 and 6 illustrate an embodiment of the invention wherein handles 41, 42 are tubular and have a central flat area 43 on each handle joined intermediate the extend of the flat area by a pivot pin 44. Each handle terminates away from the pivot pin in a hand grip 46 which may extend 6 inches beyond the terminal point 47 of the tube.

The end of each handle adjacent the rake heads 11, 12 has a bent portion 49, best seen in FIG. 6. A rake head stub 51 is anchored inside bent portion 49 by a crimp 53 which may be annular. Stub 51 may be of wood and have a tapered surface 54 and a cylindrical surface 55. Conventionally, the tines of the rake are fastened against surface 55. It has been found that a bend of 7°–10° in the end portion 49 of the handle is sufficient to set the attitude of the rake heads for effective pick-up of material raked into a pile. In the embodiment of FIG. 5, 1 inch tubing has been used for the handle and the flat has been proportioned in reference to the dimension B from the pivot to end of hand grip of 17 to 18 inches and a dimension A from the pivot to the rake head of approximately 19 inches.

The bend of the portion 49, of course, depends upon the configuration of the tines of the rake head used and a departure of from 3°–10° from the normal axis of the handle has been determined to effect a proper rake head attitude in the conventional rake heads.

The rake of the invention is adapted to both raking and pickup chores and combines in one easy-to-manipulate tool the functions of rake and scoop. Many variations within the scope of the invention will occur to those skilled in this particular art in addition to those disclosed by the illustrative embodiments herein. It is therefore desired that the scope of the invention be measured by the appended claims, rather than by the illustrative disclosure.

I claim:

1. A garden tool comprising a first rake head, a second rake head, each head having a plurality of tines, a handle secured to each rake head; each handle having a shank, an intermediate flat portion and a grip; and a pivot joining the handles at the flat portions thereof such that the tines array is perpendicular to the plane of the flat portion of each handle.

2. A tool is accordance with claim 1 wherein the shank makes an obtuse angle to the handle.

3. A tool in accordance with claim 1 wherein the flat portion has a length equal to at least one-half the distance from the head end of the handle to the pivot.

* * * * *